United States Patent [19]

Weiss et al.

[11] 4,442,245
[45] Apr. 10, 1984

[54] EMULSION BASED ON EPOXY RESINS AND DIAMMONIUM SALTS AND ITS PREPARATION

[75] Inventors: Jörn-Volker Weiss, Haltern; Heinz Riemer, Bottrop; Friedhelm Mutzberg, Muelheim, all of Fed. Rep. of Germany

[73] Assignee: Chemische Werke Huels, AG, Marl, Fed. Rep. of Germany

[21] Appl. No.: 504,928

[22] Filed: Jun. 16, 1983

[30] Foreign Application Priority Data

Jun. 16, 1982 [DE] Fed. Rep. of Germany ....... 3222531

[51] Int. Cl.³ .................. C08L 63/00; C08K 5/16; C08J 3/06; C04B 7/35
[52] U.S. Cl. .................. 523/401; 106/90; 523/414; 523/426
[58] Field of Search .................. 523/401, 414; 106/90; 523/426

[56] References Cited

U.S. PATENT DOCUMENTS

| 2,772,248 | 11/1956 | Lieberman et al. | 523/414 |
| 3,373,048 | 3/1968 | Angstadt et al. | 106/90 |
| 3,449,278 | 6/1969 | McKay et al. | 106/90 |
| 3,839,252 | 10/1974 | Bosso et al. | 523/420 |
| 3,926,886 | 12/1975 | Kelley et al. | 106/90 |
| 3,936,405 | 2/1976 | Sturni et al. | 523/414 |

FOREIGN PATENT DOCUMENTS

| EP-A10043463 | 12/1981 | European Pat. Off. | |
| 50-19824 | 3/1975 | Japan | 523/401 |
| 56-141373 | 11/1981 | Japan | 523/401 |
| 1391922 | 4/1975 | United Kingdom | 523/414 |
| 596605 | 3/1978 | U.S.S.R. | 523/428 |

*Primary Examiner*—Ronald W. Griffin
*Attorney, Agent, or Firm*—Millen & White

[57] ABSTRACT

Epoxy resin-diammonium salt emulsions are based on a liquid epoxy resin, a latent curing agent, and an emulsifier. The latent curing agent comprises diammonium oxalates and the emulsifiers are $C_8$- to $C_{14}$- alcohols and/or the adducts thereof with up to 10 ethylene oxide groups. A process for the production of such emulsions is provided. They are useful in epoxy resin mortars and epoxy resin-cement mortars, and for the sealing of concrete surfaces.

15 Claims, No Drawings

EMULSION BASED ON EPOXY RESINS AND DIAMMONIUM SALTS AND ITS PREPARATION

CROSS REFERENCE TO RELATED APPLICATIONS

This application is related to commonly assigned, U.S. Ser. Nos. 504,929 and 505,039, filed on June 16, 1983, whose disclosures are incorporated by reference herein.

BACKGROUND OF THE INVENTION

Because of their unique properties, epoxy resins are increasingly finding a great variety of uses in the building industry (cf. for example, H. Saechtling, "Bauen mit Kunststoffen" [Building with Synthetic Resins], Carl-Hanser Publishers, Munich, 1973). Besides the pure epoxy resin mortars, utilized, for example, for coatings and adhesive bonds, interesting possibilities of application in the building industry are also offered by epoxy resin-cement mortars due to their good adhesive srtrength, satisfactory shrinkage characteristics, and their water retention capacity.

An essential prerequisite for the use of epoxy resins is that the resin and the curing agent react, under the weathering conditions prevailing at the building site, extensively completely with each other within an adequate period of time.

The binder mixture described in DOS No. 2,840,874, consisting of an hydraulic binder, an epoxy resin, the adduct from a polyamine and an epoxy compound, water, and optionally reactive diluents, pigments, and other auxiliary agents, is particularly suitable for renovating damaged reinforced concrete parts, since the use of a corrosion-protective primer is not needed with this mixture.

A disadvantage of this bicomponent sysem is that, due to its limited stability, it must be prepared at the building site and processed within a relatively brief time span (about one-half hour). It is also known that the ratio of curing agent to epoxy resin is of decisive importance. The cited process, wherein a rapid and very careful intermixing is important lest impairment of quality occur, therefore has significant drawbacks under practical conditions.

According to U.S. Pat. No. 3,926,886, it is more advantageous to start with an epoxy resin-diammonium acetate or formate emulsion consisting of a liquid epoxy resin, water, and a substituted diammonium salt, and to effect curing in the presence of cement.

The diammonium salt has a dual function in this process. On the one hand, it is to liberate the basic diamine after reacting with the alkaline-acting cement, the diamine then curing the epoxy resin. On the other hand, it is to function as an emulsifier. However, stability of the thus-produced emulsion is not ensured, especially if the process must be carried out under extreme weather conditions. For this reason, even U.S. Pat. No. 3,926,886 suggests the addition to the mixture of up to 15% of a commercially available emulsifier. Yet, even after making such additions, the stability of the emulsion remains a disadvantageous, critical factor.

It is further unsatisfactory that only certain diamines containing ether groups and of the formula $R_1-O-R_2-NH-R_3-NH_2$ are suitable as the amine component. $R_1$ is an alkyl of at least 8 carbon atoms and $R_2$ and $R_3$ are lower alkylene of 2-4 carbon atoms. In contrast, it would be desirable to use more readily available diamines for preparing emulsions. The predominant number of such diamines, however, are miscible with water in any desired ratio—in contrast to the diamines in U.S. Pat. No. 3,926,886. The formates and acetates of such other diamines cannot be emulsified with the customary emulsifiers, such as, for example, fatty alcohol oxethylates, alkyl sulfonates, or phosphoric acid half esters (monoesters). On the other hand, only homogeneous, stable emulsions are capable of ensuring, in uniform quality, cold curing of the liquid epoxy compounds utilized.

SUMMARY OF THE INVENTION

Therefore, it is an object of this invention to provide formulations permitting the preparation of stable, aqueous epoxy resin-diammonium salt emulsions.

It is another object of this invention to provide such formulations using diamines suitable for the curing of epoxy resins, which diamines themselves have no emulsifier effect.

Upon further study of the specification and appended claims, further objects and advantages of this invention will become apparent to those skilled in the art.

These objects have been attained by providing emulsions comprising the following components:
1. a liquid epoxy resin,
2. a primary aliphatic alcohol of 8-14, e.g., 12-14 carbon atoms and/or its adduct with up to 10 ethylene oxide groups (emulsifier) per molecule,
3. the reaction product obtained by the complete neutralization of a diamine of Formula I or II $$H_2N-CH_2-R-NH_2 \qquad \text{I}$$

$$H_2N-R-CH_2-R-NH_2 \qquad \text{II}$$

with oxalic acid,
wherein R is substituted alkylene or cycloalkylene of 6-9 carbon atoms or aralkylene of 7-9 carbon atoms (latent curing agent), and
4. water.

This invention furthermore relates to a process for producing these emulsions, as well as to the use of the latter.

DETAILED DISCUSSION

It is to be noted that, herein, the term "emulsion" includes not only two-phase systems produced by dispersing a liquid phase in another liquid phase, but also those systems wherein a solid phase is dispersed in a liquid phase, as well as all intermediates between these two systems.

In preparing these emulsions, the amine component is not to react with epoxy resins to form adducts at an elevated temperature, as described, for example, in EP No. Al-00 43 463, which adducts are rendered water-soluble and dispersible by the addition of an acid; rather, here there is involved the preparation of an emulsion from a diammonium salt and an epoxy resin wherein the curing process is initiated only after the addition of an alkaline-reacting compound.

The emulsions can be used in accordance with this invention in epoxy resin mortars, and also in epoxy resin-cement mortars. They are also useful in curing mixtures containing alkaline-reacting compounds and optional mineral fillers. They are furthermore suitable for sealing fresh concrete surfaces to improve the water retention capacity of the concrete. Moreover, their use in these fashions is fully conventional unless indicated otherwise herein and is described in H. Saechtling, "Bauen mit Kunststoffen", Carl-Hanser Publishers, Munich, 1973.

For example, when used in the mentioned mixtures, they are normally contained in amounts of 5-50 wt. %. Regarding their use, also see commonly assigned U.S. patent application Ser. No. 505,039, filed on June 16, 1983, whose disclosure is incorporated by reference herein.

The diamines, which are a component of the curing agent, have the Formula I or II

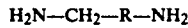

$H_2N-CH_2-R-NH_2$      I $H_2N-R-CH_2-R-NH_2$      II wherein R is alkyl substituted alkylene or cycloalkylene of 6-9 carbon atoms in total or aralkylene of 7-9 carbon atoms in total. Especially suitable are tolylene residues as well as alkylene and cyclohexylene residues substituted by one to three methyl groups. Preferred compounds are 2,2,4-trimethylhexamethylenediamine (TMD), xylylenediamines, or diamines containing one or two cyclohexane rings, e.g. 3-aminoethyl-3,5,5-trimethylcyclohexylamine (isophoronediamine, IPD), or 4,4'-diamino-3,3'-dimethyldicyclohexylmethane.

The oxalic acid can be replaced by acetic acid to an extent of up to 25% by weight. Independently therefrom, the oxalic acid can also be replaced by aliphatic dicarboxylic acids of 3-6 carbon atoms, or by any of the phthalic acid series of isomers, but the acid mixture in total must contain at least 40% by weight of oxalic acid. Such replacement aliphatic dicarboxylic acids include, for example, malonic acid or adipic acid, as well as unsaturated acids, e.g. fumaric acid, or those containing hydroxy groups, (e.g., 1-4 OH groups), e.g. tartaric acid. The neutralization reaction is fully conventional.

Suitable emulsifiers are end-positioned, i.e., primary, aliphatic alcohols of 8-14 carbon atoms, as well as mixtures thereof. Also suitable are the adducts of these alcohols with up to 10 ethylene oxide groups. Such adducts are prepared fully conventionally. Lauryl alcohol is preferred. The stability of the emulsions can be improved, if necessary, by adding lauric acid, e.g., usually in an amount of 2-10 wt. % based on the weight of epoxy resin. Based on the amount of epoxy resin employed, additions of emulsifier of 10-25% proved to be advantageous.

Suitable liquid epoxy compounds for cold curing are fully conventional, and, e.g., are predominantly reaction products of epichlorohydrin or glycidol with 2,2-bis(4-hydroxyphenyl)alkanes. The precise chemical structure of many of the commercially available epoxy resins, such as, for example the epoxy resin "EUREPOX" by Schering, Berlin, or the epoxy resin "RUTAPOX" VE 2913 by Bakelite GmbH, Duisburg, is unknown. Suitable epoxy compounds will be readily apparent to one of skill in the art and are discussed, e.g., in H. Lee and C. Neville "Handbook of Epoxy Resins" McGraw Hill, N.Y. whose disclosures are incorporated by reference herein.

The emulsions are preferably produced by first providing an aqueous solution of the diamine. The amount of diamine is dependant on the particular epoxy resin employed. However, determination of suitable amounts is fully conventional, perhaps with a few routine preliminary experiments. For example, usually appropriate data is provided by the epoxy resin manufacturer, for example in terms of the epoxy value of the epoxy resin utilized, or the indicated mixing ratio of resin and curing agent. The quantity of water most advantageous for a given emulsion is essentially dependent on the type of diamine and can also be routinely and conventionally determined. In case of diamines having a relatively small number of carbon atoms, e.g., around 7, less water is required than in the case of diamines having a larger number of carbon atoms, e.g., around 12. By varying the amount of water between about 30% and 130%, based on the amount of epoxy resin employed, the optimum amount can readily be determined by routine comparative tests.

Subsequently, a quantity of acid as required for complete neutralization is added to the aqueous solution of the diamine. A slight excess of acid in the range of up to 5 equivalent % based on the original number of amino groups is possible. In case of strong reaction heat, it is recommended to cool the reaction mixture. The emulsifier is then introduced under agitation at room temperature. Then, likewise at room temperature, the epoxy resin is gradually added into the thus-prepared mixture under rapid agitation. After addition is completed, stirring is continued for 0.5-1.0 hour. In this way, emulsions are obtained which are stable over periods of months at room temperature. Upon occurrence of phase separation, the mixtures can quickly be homogenized again by renewed agitation.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

(a) PREPARATION OF EMULSIONS (The quantitative data for oxalic acid refer in all cases to the dihydrate).

EXAMPLE 1

An upright flask with magnetic stirrer was charged with 105 parts by weight of water with 28.2 parts by weight of isophoronediamine (IPD). This solution was combined with 10.2 parts by weight of oxalic acid, 4.5 parts by weight of acetic acid, and 7.5 parts by weight of phthalic acid. After cooling the reaction mixture to room temperature, 6.0 parts by weight of lauryl alcohol and, in incremental portions, 17.4 parts by weight of lauric acid were introduced into the mixture under agitation. Subsequently, under rapid stirring (about 1,000 rpm), 120 parts by weight of epoxy resin "RUTAPOX" VE 2913 was gradually added to the mixture. Thereafter, stirring was continued for another hour with the same agitator speed, thus obtaining a low-viscous emulsion which, after two months, did not as yet show any changes.

COMPARATIVE EXAMPLE A

The procedure of Example 1 was repeated, but effecting neutralization of the diamine this time exclusively with 21.6 parts by weight of acetic acid. The resultant emulsion disintegrated as early as after a few minutes.

COMPARATIVE EXAMPLE B

The procedure of Example 1 was repeated, but this time the diamine was neutralized exclusively with 16.2 parts by weight of formic acid. The thus-obtained emulsion disintegrated as early as after a few minutes.

EXAMPLE 2

A low-viscous, stable emulsion was prepared as described in Example 1 from 90 parts by weight of water, 28.2 parts by weight of IPD, 19.8 parts by weight of oxalic acid, 3 parts by weight of tartaric acid, 12 parts by weight of lauryl alcohol, and 120 parts by weight of epoxy resin "RÜTAPOX" VE 2913. The slight unmixing, which occurred after three months of storage at room temperature, could be eliminated by stirring the emulsion up.

EXAMPLE 3

A stable, low-viscous emulsion was prepared as disclosed in Example 1 from 15 parts by weight of water, 4.4 parts by weight of 2,2,4-trimethylhexamethylenediamine (TMD), 3.5 parts by weight of oxalic acid, 2.0 parts by weight of lauryl alcohol, and 20 parts by weight of epoxy resin "RÜTAPOX" VE 2913.

EXAMPLE 4

As described in Example 1, a stable emulsion of medium viscosity was prepared from 20 parts by weight of water, 6.6 parts by weight of 4,4'-diamino-3,3'-dimethyldicyclohexylmethane, 3.8 parts of oxalic acid, 2.0 parts by weight of lauryl alcohol, and 20 parts by weight of epoxy resin "RÜTAPOX" VE 2913.

EXAMPLE 5

A stable emulsion was produced as set forth in Example 1 from 10 parts by weight of water, 3.8 parts by weight of xylylenediamine (mixture of isomers), 3.6 parts by weight of oxalic acid, 2.0 parts by weight of lauryl alcohol, 2.0 parts by weight of lauric acid, and 20 parts by weight of epoxy resin "RÜTAPOX" VE 2913.

EXAMPLE 6

As disclosed in Example 1, an emulsion of low viscosity was prepared from 40 parts of water, 9.4 parts by weight of IPD, 3.2 parts by weight of fumaric acid, 3.5 parts by weight of oxalic acid, 4.0 parts by weight of lauryl alcohol, 4.0 parts by weight of lauric acid, and 40 parts by weight of epoxy resin "RÜTAPOX" VE 2913.

EXAMPLE 7

An emulsion of low viscosity was produced as disclosed in Example 1 from 35 parts by weight of water, 9.4 parts by weight of IPD, 3.5 parts by weight of oxalic acid, 4.1 parts by weight of adipic acid, 2.0 parts by weight of lauryl alcohol, 2.0 parts by weight of lauric acid, and 40 parts by weight of epoxy resin "RÜTAPOX" VE 2913.

EXAMPLE 8

A low-viscosity emulsion was prepared as described in Example 1 from 35 parts by weight of water, 9.4 parts by weight of IPD, 3.5 parts by weight of oxalic acid, 2.9 parts by weight of malonic acid, 2.0 parts by weight of lauryl alcohol, 2.0 parts by weight of lauric acid, and 40 parts by weight of epoxy resin "RÜTAPOX" VE 2913.

EXAMPLE 9

An emulsion of low viscosity was produced as set forth in Example 1 from 35 parts by weight of water, 9.4 parts by weight of IPD, 1.5 parts by weight of acetic acid, 2.5 parts by weight of phthalic acid, 3.5 parts by weight of oxalic acid, 2.0 parts by weight of lauryl triglycol, 2.0 parts by weight of lauric acid, and 40 parts by weight of epoxy resin "RÜTAPOX" VE 2913.

EXAMPLE 10

As described in Example 1, an emulsion of low viscosity was prepared from 15 parts by weight of water, 4.7 parts by weight of IPD, 0.5 part by weight of tartaric acid, 3.3 parts by weight of oxalic acid, 2.0 parts by weight of lauryl alcohol, 0.5 part by weight of a mixture of dodecyl and tetradecyl alcohols ("ALFOL" 12/14), reacted with 9 moles of ethylene oxide, and 20 parts by weight of epoxy resin "RÜTAPOX" VE 2913.

EXAMPLE 11

An emulsion of medium viscosity was prepared as described in Example 1 from 12 parts by weight of water, 4.7 parts by weight of IPD, 0.5 part by weight of tartaric acid, 3.3 parts by weight of oxalic acid, 2.0 parts by weight of lauryl triglycol, and 20 parts by weight of epoxy resin "RÜTAPOX" VE 2913.

EXAMPLE 12

A stable emulsion was produced as set forth in Example 1 from 10 parts by weight of water, 3.5 parts by weight oxalic acid, 4.7 parts by weight of isophoronediamine, 1.5 parts by weight of 2-ethylhexanol, and 20 parts by weight of epoxy resin "RÜTAPOX" VE 2913.

(b) PREPARATION OF EPOXY RESIN-CEMENT MORTARS

EXAMPLE 13

For the preparation of an epoxy resin-cement mortar, 100 parts by weight of Portland cement 35F was mixed with 45 parts by weight of water, 20 parts by weight of the emulsion described in Example 1, and 485 parts by weight of fillers (60 parts by weight of EFA filler, 170 parts by weight of sand HSE ⅜ mm, 170 parts by weight of sand 0/1 mm, 85 parts by weight of sand ⅛ mm) (in accordance with DIN [German Industrial Standard] 1164). The test specimens made from this mixture were stored under humid conditions for seven days and at room temperature for 21 days. The strengths measured according to DIN 1164 were 53.5 N/mm$^2$, compressive strength and 8.67 N/mm$^2$ flexural tensile strength. (EFA = electro filter ash)

EXAMPLE 14

The mortar was produced, as described in Example 13, from 100 parts by weight of Portland cement 35F with 60 parts by weight of water, 23.4 parts by weight of the emulsion from Example 2, and 485 parts by weight of fillers. The strengths of the test specimens, measured according to DIN 1164, were 48.8 N/mm$^2$ compressive strength and 8.88 N/mm$^2$ flexural tensile strength.

(c) PREPARATION OF EPOXY RESIN MORTARS

EXAMPLE 15

A mixture was prepared from 40 parts by weight of sand 0/1 mm and 15 parts by weight of the emulsion set forth in Example 1, whereafter 1.5 parts by weight of a 50% sodium hydroxide solution was incorporated into the thus-obtained composition, thus obtaining a homogeneous, flowable mortar which was cured within 24 hours at a temperature of 23° C. to a firm, tack-free mass.

EXAMPLE 16

As described in Example 15, an epoxy resin mortar was produced from 40 parts by weight of sand 0/1 mm, 15 parts by weight of the emulsion described in Example 1, and 0.65 part by weight of calcium hydroxide.

EXAMPLE 17

As disclosed in Example 15, an epoxy resin mortar was prepared from 40 parts by weight of sand 0/1 mm, 10 parts by weight of the emulsion described in Example 2, and 1 part by weight of a 50% sodium hydroxide solution.

(d) SEALING OF FRESH CONCRETE SURFACES

EXAMPLE 18

The surface of a concrete test specimen having a fresh bulk density of 2,380 kg/m³ (produced from Portland cement 35F, water-cement ratio 0.55, and additives) was coated with the emulsion described in Example 1 (169 g/m²). After storing the test specimen in a room for six weeks, the bulk density of the specimen was 2,292 kg/m³. In a comparative test specimen (fresh bulk density likewise 2,380 kg/m³), wherein the surface remained untreated, the bulk density was 2,262 kg/m³ after six weeks of storage under identical conditions.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. An epoxy resin-diammonium salt emulsion, comprising
    (a) a liquid epoxy resin;
    (b) about 30–130 wt. % of water based on the amount of epoxy resin;
    (c) an emulsifying effective amount of an emulsifier comprising a primary, aliphatic alcohol of 8–14 carbon atoms, an adduct thereof with up to 10 ethylene oxide groups, or a mixture thereof; and
    (d) an effective amount of a latent curing agent comprising a reaction product of the essentially complete neutralization of a diamine of the formulae $$H_2N-CH_2-R-NH_2$$

or $$H_2N-R-CH_2-R-NH_2$$

with oxalic acid,
    wherein R is alkyl substituted alkylene or cycloalkylene each of 6–9 carbon atoms in total, or phenylalkylene of 7–9 carbon atoms in total.

2. An epoxy resin-diammonium salt emulsion of claim 1 wherein the amount of emulsifier is 10–25 wt. % based on the weight of epoxy resin employed.

3. An epoxy resin-diammonium salt emulsion of claim 1 wherein the emulsifier is lauryl alcohol.

4. An epoxy resin-diammonium salt emulsion of claim 1 wherein the emulsifier additionally comprises 2–10 wt. % of lauric acid.

5. An epoxy resin-diammonium salt emulsion of claim 1 wherein an amount of up to 25 wt. % of the oxalic acid is replaced by an equivalent amount of acetic acid.

6. An epoxy resin-diammonium salt emulsion of claim 1, wherein an amount up to 60 wt. % of the oxalic acid, is replaced by a dicarboxylic acid of 3–6 carbon atoms, an hydroxy substituted dicarboxylic acid of 3–6 carbon atoms, a phathalic acid isomer or a mixture thereof.

7. An epoxy resin-diammonium salt emulsion of claim 1, wherein an amount up to 60 wt. % of the oxalic acid, is replaced by a dicarboxylic acid of 3–6 carbon atoms, an hydroxy substituted dicarboxylic acid of 3–6 carbon atoms, a phthalic acid isomer, acid acid, or a mixture thereof.

8. An epoxy resin-diammonium salt emulsion of claim 1 wherein in the diamine, R is tolylene, or alkylene or cyclohexylene each substituted by 1–3 methyl groups.

9. An epoxy resin-diammonium salt emulsion of claim 1 wherein the diamine contains one or two cyclohexane rings.

10. An epoxy resin-diammonium salt emulsion of claim 1 wherein the diamine is 2,2,4-trimethylhexamethylenediamine, 3-aminomethyl-3,5,5-trimethylcyclohexylamine, or 4,4'-diamino-3,3'-dimethyldicyclohexylmethane.

11. An epoxy resin-diammonium salt emulsion of claim 1 wherein the liquid epoxy resin is a product of epichlorohydrin or glycidol with a 2,2-bis(4-hydroxyphenyl) alkane.

12. A process for preparing an epoxy resin-diammonium salt emulsion of claim 1 comprising,
    (a) forming an aqueous solution of the diamine,
    (b) adding to this solution an amount of oxalic acid sufficient for complete neutralization,
    (c) adding the emulsifier, and
    (d) adding the liquid epoxy resin under agitation.

13. In an epoxy resin-cement mortar, the improvement wherein the epoxy resin is included as an epoxy resin-diammonium salt emulsion of claim 1.

14. In a method of curing a mixture comprising an alkaline-reacting compound and, optionally, a mineral filler using a curing agent, the improvement wherein the curing agent is an epoxy resin-diammonium salt emulsion of claim 1.

15. In a method of sealing a concrete surface by applying thereto a sealing agent, the improvement wherein the sealing agent is an epoxy resin-diammonium salt emulsion of claim 1.

* * * * *